(12) United States Patent
Blumanstock et al.

(10) Patent No.: US 11,268,408 B2
(45) Date of Patent: Mar. 8, 2022

(54) METHOD OF REPAIRING AN ENGINE CASE FLANGE

(71) Applicant: Chromalloy Gas Turbine LLC, Palm Beach Gardens, FL (US)

(72) Inventors: Ben Blumanstock, Stuart, FL (US); Steve Massicotte, Bristol, CT (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 0 days.

(21) Appl. No.: 17/086,609

(22) Filed: Nov. 2, 2020

(65) Prior Publication Data
US 2021/0131310 A1 May 6, 2021

Related U.S. Application Data

(60) Provisional application No. 62/928,688, filed on Oct. 31, 2019.

(51) Int. Cl.
*F01D 25/28* (2006.01)
*B23P 6/00* (2006.01)

(52) U.S. Cl.
CPC ............ *F01D 25/285* (2013.01); *B23P 6/002* (2013.01); *F05D 2230/80* (2013.01)

(58) Field of Classification Search
CPC ........ F01D 25/285; B23P 6/002; B23P 6/045; F05D 2230/80
See application file for complete search history.

(56) References Cited

U.S. PATENT DOCUMENTS

| | | | | |
|---|---|---|---|---|
| 4,147,918 A * | 4/1979 | Ritter | ............... | B25G 3/34 |
| | | | | 219/101 |
| 5,230,540 A * | 7/1993 | Lewis | ............... | F02K 1/80 |
| | | | | 285/363 |
| 8,257,039 B2 * | 9/2012 | Rose | ............... | F01D 25/24 |
| | | | | 415/215.1 |
| 10,094,285 B2 * | 10/2018 | Munshi | ............... | F01D 25/145 |
| 10,890,085 B2 * | 1/2021 | Thomas | ............... | F01D 25/246 |
| 2005/0044685 A1 * | 3/2005 | Brooks | ............... | B25B 27/16 |
| | | | | 29/426.5 |
| 2009/0274556 A1 * | 11/2009 | Rose | ............... | B23P 6/005 |
| | | | | 415/220 |
| 2011/0176921 A1 * | 7/2011 | Gignoux | ............... | B23P 6/005 |
| | | | | 416/204 A |

* cited by examiner

*Primary Examiner* — Lawrence Averick
(74) *Attorney, Agent, or Firm* — Avek IP, LLC (57) ABSTRACT

The present disclosure provides a system and method of repairing a flange of an engine case having a damaged section of attachment tabs and/or flange region. One or more damaged attachments tabs extending away from a flange are removed along with a first portion of the flange, thus leaving a second portion of the flange. A replacement component is produced comprising a replacement flange portion and one or more replacement tabs. The replacement flange portion is placed in contact with the second portion of the flange and the replacement flange portion is secured to the second portion of the flange.

19 Claims, 9 Drawing Sheets

METHOD OF REPAIRING AN ENGINE CASE FLANGE

CROSS-REFERENCE TO RELATED APPLICATIONS

This application claims the benefit of priority of U.S. provisional patent application No. 62/928,688, filed Oct. 31, 2019, the disclosure of which is incorporated by reference in its entirety herein.

STATEMENT REGARDING FEDERALLY SPONSORED RESEARCH OR DEVELOPMENT

Not applicable.

TECHNICAL FIELD

This present disclosure relates generally to a process for repairing a case flange of a gas turbine engine. More specifically, embodiments of the present disclosure relate to a process for removing a damaged portion of the case flange, producing a replacement flange portion having one or more attachment tabs, and securing the replacement flange portion to a portion of a flange of the engine case so as to restore overall flange thickness and capability.

BACKGROUND OF THE DISCLOSURE

A gas turbine engine typically provides a source of force or shaft power for the purpose of generating mechanical thrust or electricity, respectively. Engines that produce mechanical thrust are typically used in aircraft, such as commercial aircraft, and generally comprise a fan and a multi-stage compressor coupled to a multi-stage turbine via one or more axial shafts. Air enters the gas turbine engine and passes through the compressor where its temperature and pressure increase as it passes through subsequent stages of the compressor. The portion of the air from the fan not passing through the compressor discharges from the engine to produce thrust.

The compressed air exiting the compressor is then directed to one or more combustors where it mixes with a fuel source to create a combustible mixture. This mixture is ignited in the one or more combustors to create a flow of hot combustion gases. These gases are directed into the turbine causing the turbine to rotate, thereby driving the compressor. The output of the gas turbine engine in an aircraft application forms mechanical thrust via exhaust from the turbine.

Aircraft engines require periodic maintenance to ensure reliable and safe operation and to maintain part integrity. The engine utilizes multiple cases which contain the various sections, such as the fan, compressor and turbine. One such structure between the fan and compressor includes a fan inner case. Another case, such as a splitter case, encompasses the fan inner case. This structure also includes one or more flanges for joining the cases together.

One such example of a commercial aircraft engine having this case structure is the PW4000-100 Series Engine produced by Pratt & Whitney. This engine, which is typically capable of producing 64,500-70,000 pounds of thrust at takeoff, is utilized on certain wide-body aircraft, such as the Airbus A330. In this engine, the fan exit inner case is assembled to a low pressure compressor (LPC) stator assembly at a forward flange and to an intermediate case at an aft flange. The fan exit inner case provides mounting points for acoustic liners at a splitter fairing. The flange also includes a plurality of attachment tabs. When these cases are separated during engine overhaul, often one or more of the attachment tabs have been known to bend beyond acceptable limits or even break. Since the attachment tabs are integral to the flanges, which are integral to the case and originally machined as part of the case, when an attachment tab is damaged, the entire case may be scrapped. A typical engine case of this configuration can exceed $100,000 (USD).

BRIEF SUMMARY OF THE DISCLOSURE

The following presents a simplified summary of the disclosure to provide a basic understanding of some aspects thereof. This summary is not an extensive overview of the application. It is not intended to identify critical elements of the disclosure or to delineate the scope of the disclosure. Its sole purpose is to present some concepts of the disclosure in a simplified form as a prelude to the more detailed description that is presented elsewhere herein.

The present disclosure provides a method of repairing a flange of an engine case comprising removing one or more damaged attachment tabs extending away from the flange and removing a first portion of the flange, and retaining a second portion of the flange. A replacement component is produced comprising a replacement flange portion and one or more replacement tabs. The replacement flange portion is placed in direct contact with the second portion of the flange and the replacement flange portion is secured to the second portion of the flange.

In an embodiment of the present disclosure, a method of repairing an engine case is provided comprising providing the engine case having a circumferentially disposed flange extending radially outward from the engine case and one or more attachment tabs extending perpendicular to the flange and removing one or more damaged attachment tabs. A first portion of the flange is removed, thus retaining a second portion of the flange. A replacement component is produced comprising a replacement flange portion and one or more replacement tabs. The replacement flange is placed in direct contact with the second portion of the flange; and is secured to the second portion of the flange.

In an alternate embodiment of the present disclosure, a component for an external region of an engine case is provided comprising a replacement flange portion having one or more replacement tabs integrally formed with the replacement flange portion and spaced a predetermined distance apart. The replacement flange portion has a first thickness, such that the first thickness of the replacement flange portion and a thickness of a second portion of the flange has a total thickness equal to an original flange thickness of the engine case.

The present disclosure is aimed at providing a way of extending the life of an engine case for a gas turbine engine by providing a way of removing a portion of a damaged external flange, providing a replacement portion, and a way of securing the replacement portion to the remaining portion of the external flange. These and other features of this disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION

The present disclosure is intended for use in a gas turbine engine, such as a gas turbine used for aircraft engines and/or power generation. As such, the present disclosure is capable of being used in a variety of turbine operating environments, regardless of the manufacturer.

As those skilled in the art will readily appreciate, a gas turbine engine is circumferentially disposed about an engine centerline, or axial centerline axis. The engine includes a compressor, a combustion section and a turbine with the turbine coupled to the compressor via an engine shaft. As is well known in the art, air compressed in the compressor is mixed with fuel and ignited in the combustion section and then expanded in the turbine. The hot combustion gases exiting the turbine generate mechanical thrust used in propulsion of aircraft.

Figure 1:
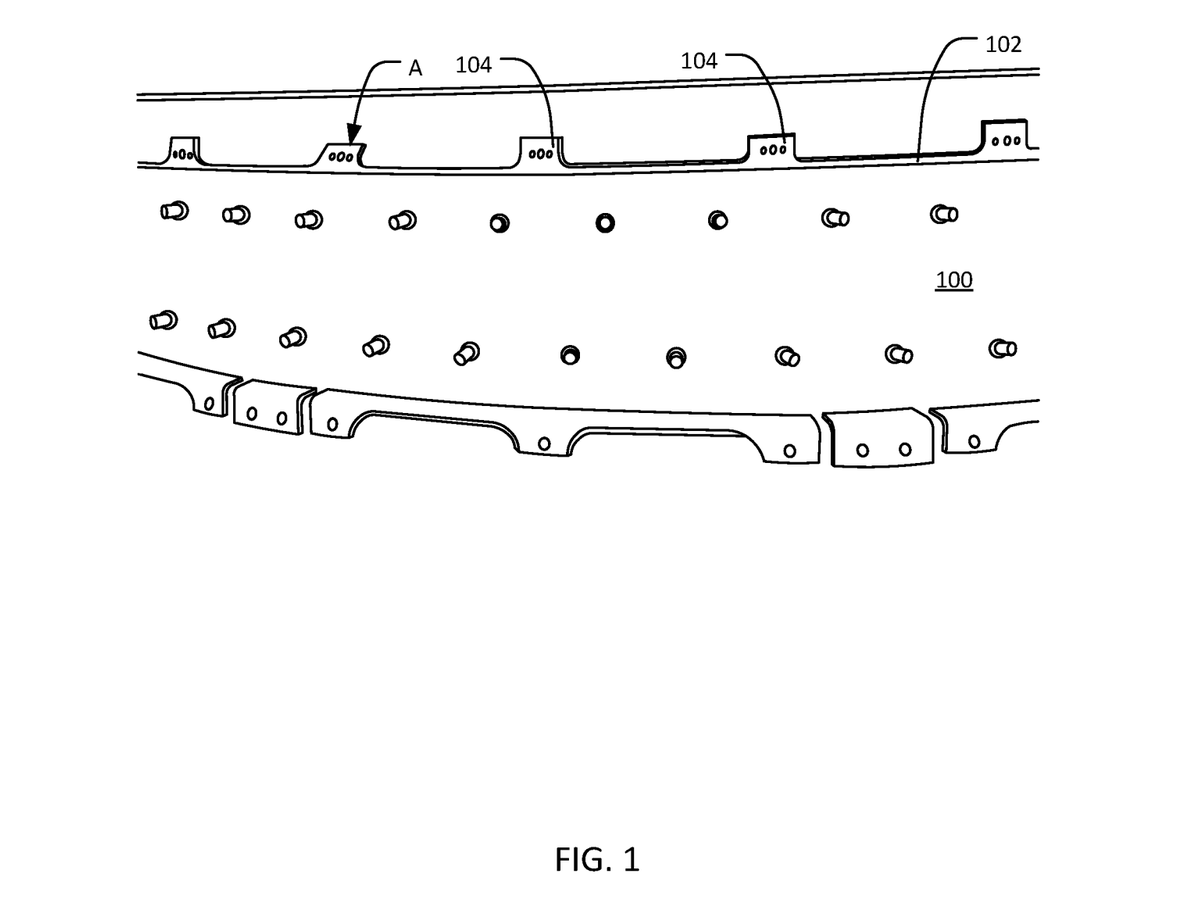
FIG. 1 is a perspective view of a portion of an engine case of a gas turbine engine exhibiting damage subject of the present disclosure.

The present disclosure is depicted in FIGS. 1-9. Referring initially to FIG. 1, a portion of an engine case 100 is depicted. The engine case 100 comprises a flange 102 encompassing the engine case 100. Extending away from the flange 102 are a plurality of attachment tabs 104 spaced about the flange 102. The attachment tabs 104 are preferably perpendicular to the flange 102. As it can be seen in FIG. 1, periodically, the attachment tabs 104 may bend. While the original equipment manufacturer provides for limited bending or straightening as approved repairs, excessive bending and straightening can lead to material fatigue and failure. One such over bent condition beyond repair is depicted by region A. Typically, engine cases exhibiting this level of damage to the attachment tabs 104 would result in scrapping the engine case 100.

Figure 2:
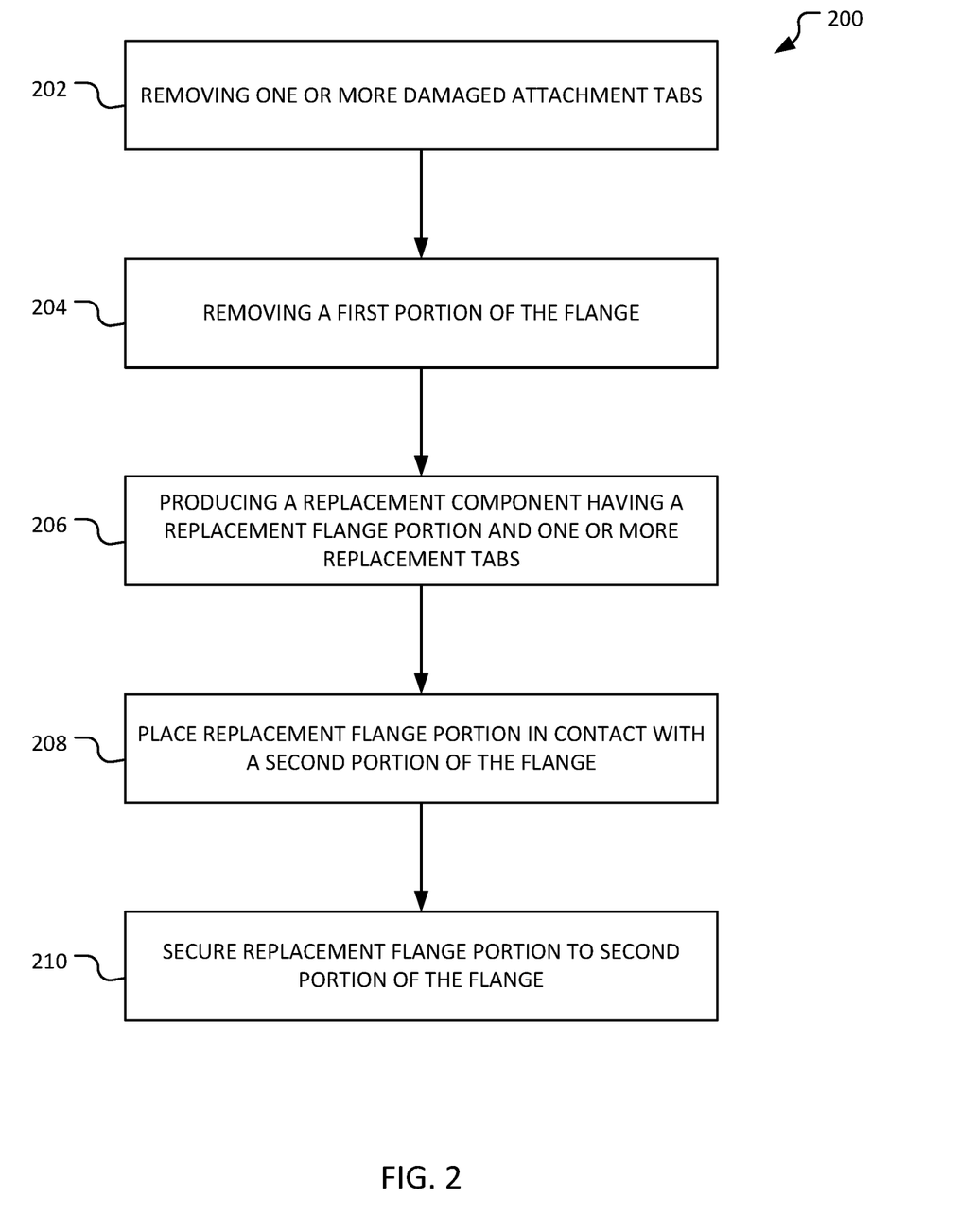
FIG. 2 is a process diagram outlining a method of repairing an engine case in accordance with an embodiment of the present disclosure.

Referring now to FIG. 2, a method 200 of repairing a flange of an engine case is disclosed. The steps outlined in FIG. 2 are shown in further detail in FIGS. 3-9. In a step 202, one or more damaged attachment tabs are removed from the flange. Then, in a step 204, a first portion of the flange is removed, thus retaining a second portion of the flange. A replacement component is produced in a step 206 comprising a replacement flange portion and one or more replacement tabs. In a step 208, the replacement flange portion is placed in direct contact with the second portion of the flange. In a step 210, the replacement flange portion is secured to the second portion of the flange.

Figure 3:
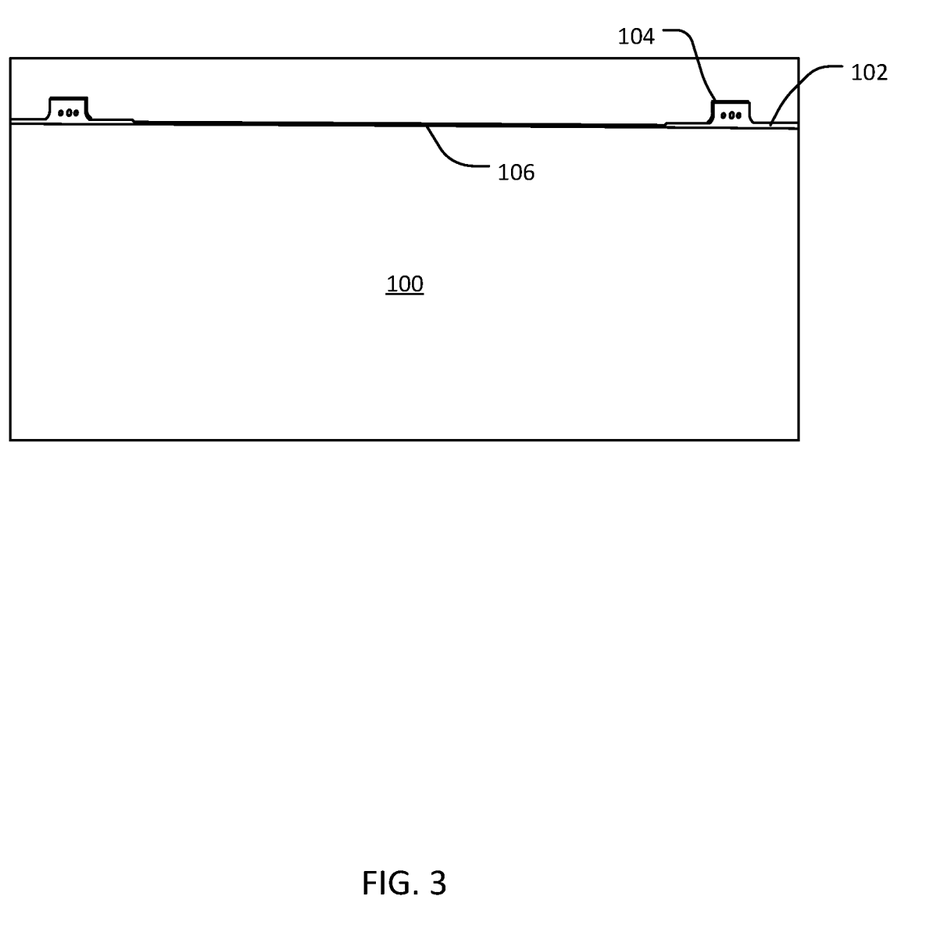
FIG. 3 is a side elevation view of a portion of an engine case in accordance with an embodiment of the present disclosure.
Figure 4:
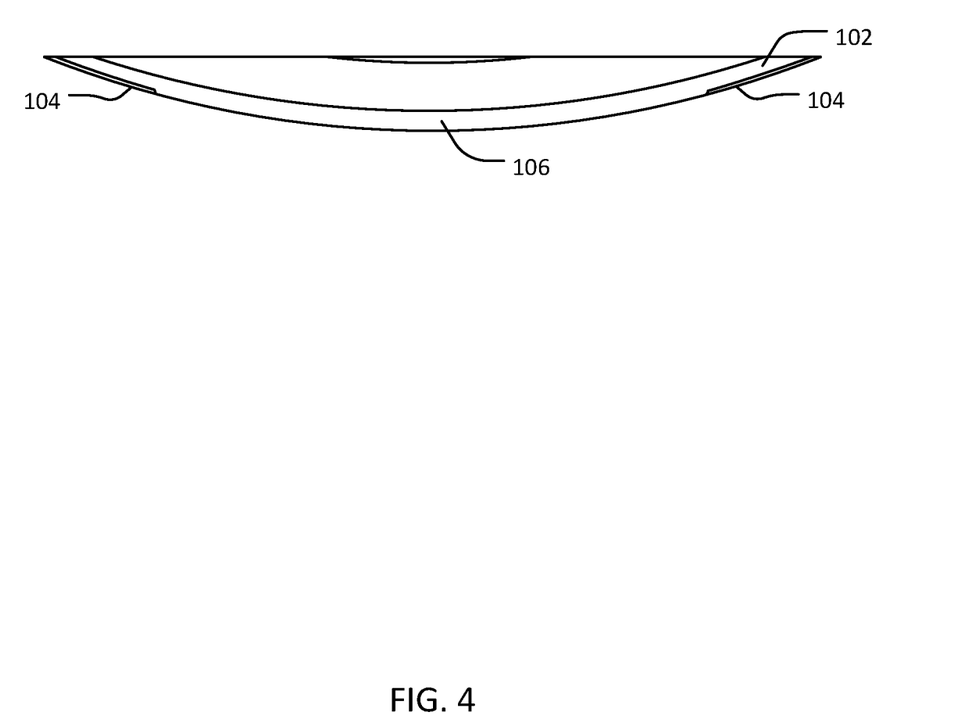
FIG. 4 is a top elevation view of a portion of the engine case of FIG. 3 in accordance with an embodiment of the present disclosure.

The step 202 of removing the one or more damaged attachment tabs is shown with respect to the engine case 100 in FIGS. 3 and 4. More specifically, the damaged attachment tabs 104 are removed as well as a first portion of the adjacent flange 102. Having removed a first portion of the flange 102 results in a second portion 106 of the flange 102 remaining.

Figure 5:
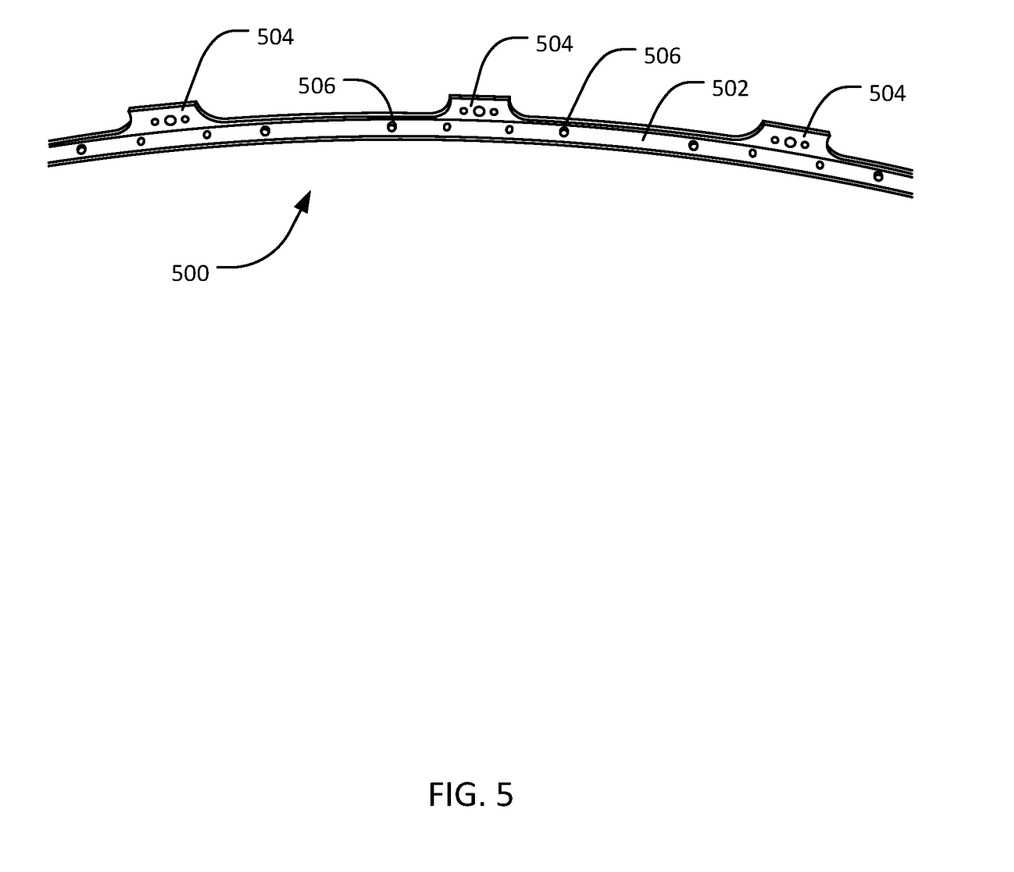
FIG. 5 is a perspective view of a replacement component comprising a replacement flange portion and one or more attachment tabs in accordance with an embodiment of the present disclosure.

Referring now to FIG. 5, a replacement component 500 is depicted. The replacement component 500 comprises a replacement flange portion 502 and one or more replacement tabs 504. The one or more replacement tabs 504 extend generally perpendicular from the replacement flange portion 502 and are located in the same location as the attachment tabs 104 which were removed from flange 102. Due to the failure and damage to attachment tabs 104, as depicted in FIG. 1, the replacement component 500 is fabricated from a material having a hardness greater than the flange 102 and attachment tabs 104. For an embodiment of the disclosure, the replacement component 500 is fabricated from a stainless steel while the flange 102 and attachment tabs 104 are fabricated from aluminum. This material change is desirable to prevent repeated failures of the attachment tabs 104.

The replacement component 500 can be fabricated from a variety of processes. For example, in one embodiment of the present disclosure, the replacement component 500 is fabricated from bar stock through a set of milling operations. The process results in the desired size replacement component with the attachment tabs 504 integral to the replacement flange portion 502. In an alternate embodiment of the present disclosure, the replacement component 500 may be fabricated through an additive manufacturing process, such as 3-D printing.

The replacement component 500, as shown in FIG. 5, is a portion of the overall flange section encompassing the engine case 100. Typically, only a portion or quadrant of the flange 102 and attachment tabs 104 must be replaced.

Figure 6:
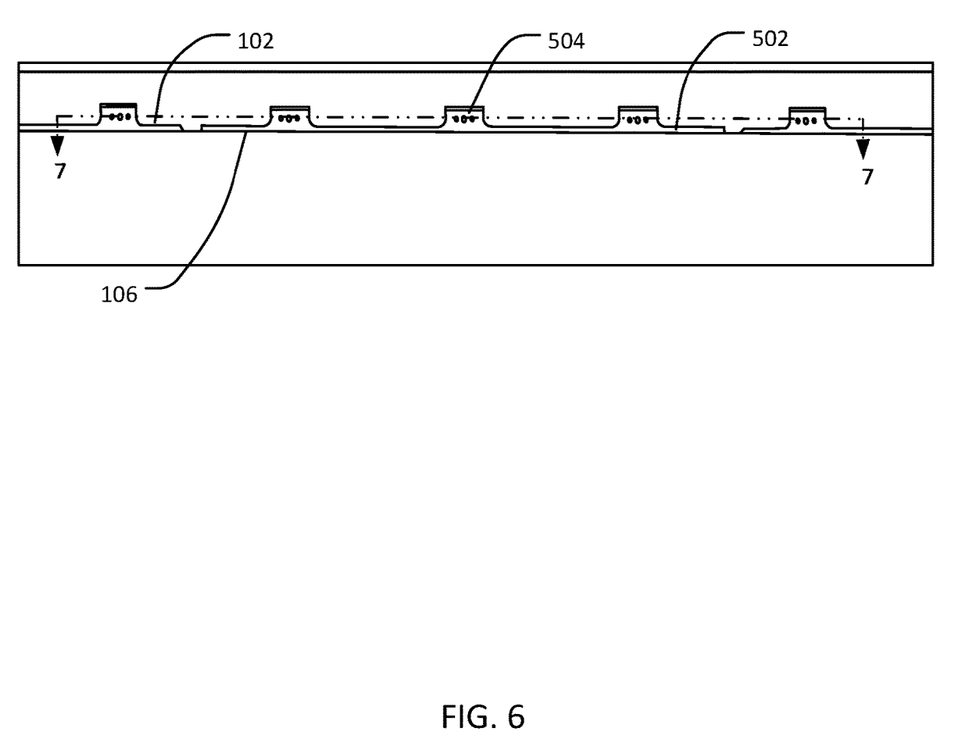
FIG. 6 is a side elevation view of a portion of the engine case incorporating an embodiment of the present disclosure.
Figure 7:
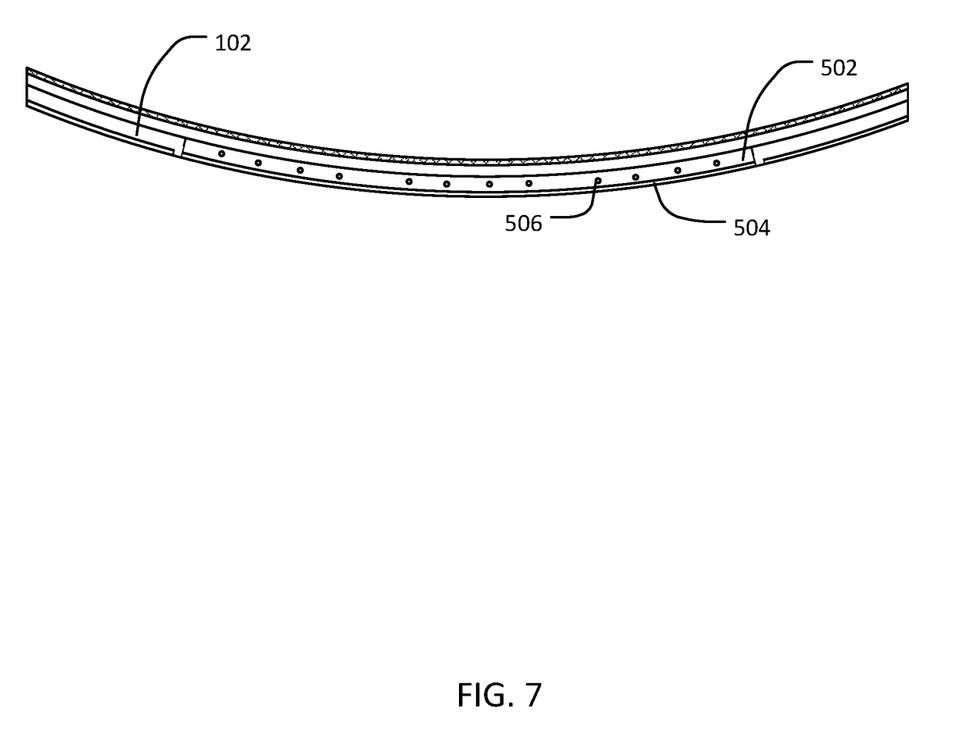
FIG. 7 is a top elevation view of a portion of the engine case of FIG. 6 incorporating an embodiment of the present disclosure.

Referring now to FIGS. 6 and 7, implementation of the present disclosure on the engine case 100 is shown. FIG. 6 represents a side view of the replacement component 500 positioned on the second portion 106 of the flange 102. The replacement component 500 also comprises a plurality of through holes 506 in the flange 502. The replacement component 500, when placed on the second portion 106 of the flange 102, provides a flange section having the same height as the remainder of the flange 102 from the rest of the engine case 100. Although intended for a surface to surface contact, a gap of up to 0.002" is permissible between the flange 502 of the replacement component 500 and the second portion 106 of flange 102.

Figure 8:
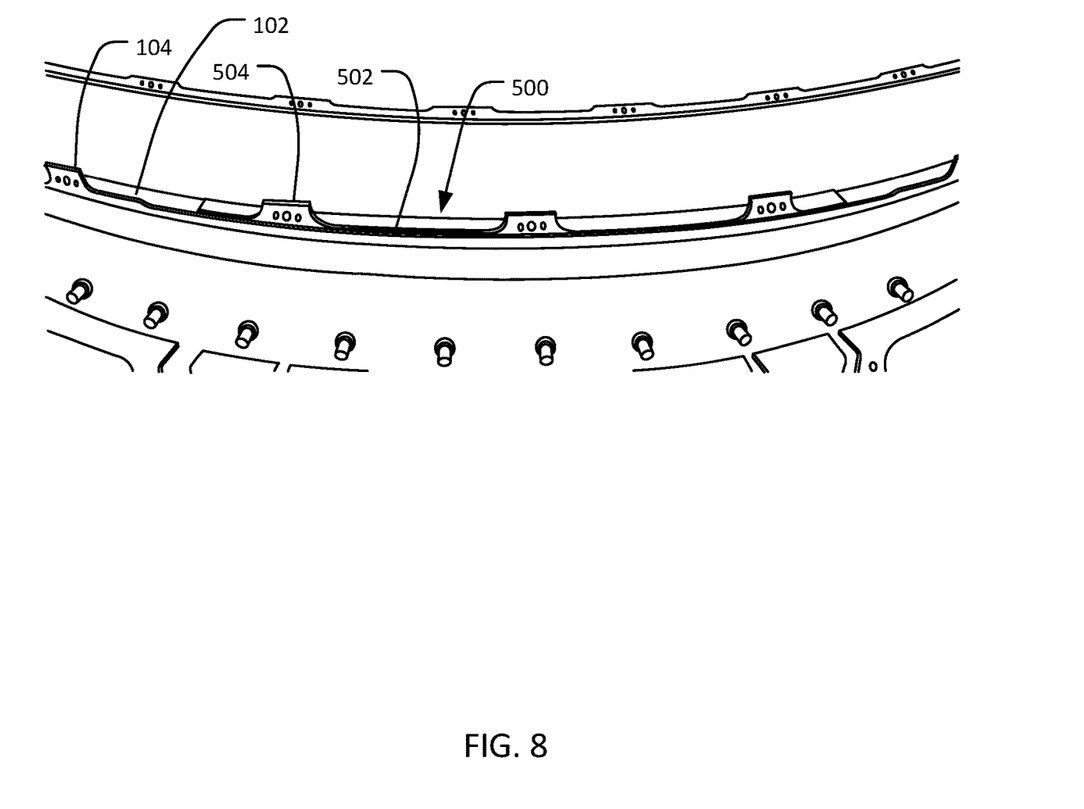
FIG. 8 is a perspective view of a portion of the engine case including an embodiment of the present disclosure being installed along a flange portion.
Figure 9:
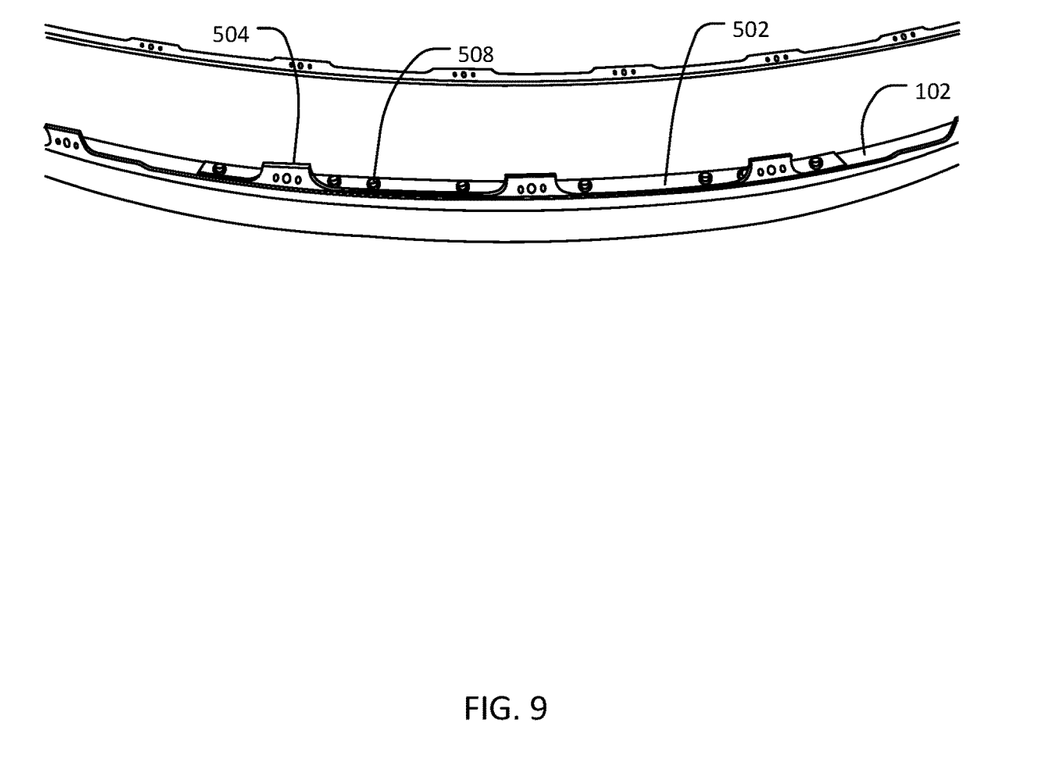
FIG. 9 is an elevation view depicting an embodiment of the present disclosure installed on the engine case in accordance with an embodiment of the present disclosure.

FIG. 8 depicts an assembly process for securing the replacement component 500 to the second portion 106 of flange 102. The replacement component 500 is clamped to the second flange portion 106 and a plurality of fasteners 508, such as rivets, are used to secure the replacement component 500 to the flange 102 of the engine case 100. In an alternate configuration, the plurality of fasteners can be removable, such as bolts. A repaired flange 102 of engine case 100 incorporating the replacement component 500 is shown in FIG. 9.

Although a preferred embodiment of this disclosure has been provided, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious, and which are inherent to the structure.

It will be understood that certain features and subcombinations are of utility and may be employed without reference to other features and subcombinations. This is contemplated by and is within the scope of the claims.

What is claimed is:

1. A method of repairing a flange of an engine case comprising:
    removing one or more damaged attachment tabs extending away from the flange;
    removing only a first portion of the flange adjacent the one or more damaged attachment tabs, and retaining a second portion of the flange;
    producing a replacement component comprising a replacement flange portion and one or more replacement tabs;
    placing the replacement flange portion in direct contact with the second portion of the flange; and
    securing the replacement flange portion to the second portion of the flange;
    wherein a height of the replacement flange portion plus a height of the second portion of the flange is equal to a height of the flange.

2. The method of claim 1, wherein the flange encompasses the engine case and is integral to the engine case.

3. The method of claim 1, wherein the replacement component does not encompass the engine case.

4. The method of claim 1, wherein the replacement component is machined from bar stock.

5. The method of claim 1, wherein the replacement component is produced from an additive manufacturing process.

6. The method of claim 1 further comprising placing one or more holes in the replacement flange portion.

7. The method of claim 6 further comprising placing a plurality of rivets through openings in the replacement flange portion and the second portion of the flange.

8. The method of claim 6 further comprising placing a plurality of removeable fasteners through openings in the replacement flange portion and the second portion of the flange.

9. The method of claim 1, wherein the replacement component is fabricated from a material having a hardness greater than the flange and attachment tabs.

10. A method of repairing an engine case comprising:
    providing the engine case having a circumferentially disposed integral flange extending radially outward from the engine case and one or more attachment tabs extending perpendicular to the flange;
    removing one or more damaged attachment tabs;
    removing a first portion of the flange, thus retaining a second portion of the flange;
    producing a replacement component comprising a replacement flange portion and one or more replacement tabs;
    placing the replacement flange portion in direct contact with the second portion of the flange; and
    securing the replacement flange portion to the second portion of the flange.

11. The method of claim 10, wherein the replacement component is machined from bar stock.

12. The method of claim 10, wherein the replacement component is produced from an additive manufacturing process.

13. The method of claim 10 further comprising placing one or more holes in the replacement flange portion.

14. The method of claim 10 further comprising placing a plurality of rivets through openings in the replacement flange portion and the second portion of the flange.

15. The method of claim 10 further comprising placing a plurality of removeable fasteners through openings in the replacement flange portion and the second portion of the flange.

16. A method of repairing an engine case comprising:
    providing the engine case having a circumferentially disposed integral flange extending radially outward from the engine case and an attachment tab extending perpendicular to the flange;
    removing a damaged attachment tab;
    removing a first portion of the flange while retaining a second portion of the flange;
    milling a bar stock to produce a replacement component comprising a replacement flange portion and a replacement tab;
    placing the replacement flange portion in direct contact with the second portion of the flange; and
    securing the replacement flange portion to the second portion of the flange.

17. The method of claim 16, wherein the replacement flange portion is removably secured to the second portion of the flange.

18. The method of claim 16, wherein the replacement flange portion is permanently secured to the second portion of the flange.

19. The method of claim 18, wherein the replacement flange portion is riveted to the second portion of the flange.

* * * * *